(12) United States Patent
Honda et al.

(10) Patent No.: US 7,495,603 B2
(45) Date of Patent: Feb. 24, 2009

(54) RADAR APPARATUS

(75) Inventors: Kanako Honda, Kobe (JP); Osamu Isaji, Kobe (JP)

(73) Assignee: Fujitsu Ten Limited, Kobe (JP)

( * ) Notice: Subject to any disclaimer, the term of this patent is extended or adjusted under 35 U.S.C. 154(b) by 106 days.

(21) Appl. No.: 11/219,658

(22) Filed: Sep. 7, 2005

(65) Prior Publication Data

US 2006/0055589 A1    Mar. 16, 2006

(30) Foreign Application Priority Data

Sep. 10, 2004   (JP) ............................. 2004-263862

(51) Int. Cl.
*G01S 13/00*   (2006.01)
(52) U.S. Cl. .......................... 342/70; 342/79
(58) Field of Classification Search .................... 342/70
See application file for complete search history.

(56) References Cited

U.S. PATENT DOCUMENTS

| | | | |
|---|---|---|---|
| 5,757,307 A * | 5/1998 | Nakatani et al. ............... | 342/70 |
| 5,940,029 A | 8/1999 | Ninomiya et al. | |
| 6,087,980 A * | 7/2000 | Saryo .......................... | 342/128 |
| 6,292,129 B1 | 9/2001 | Matsugatani et al. | |
| 6,420,996 B1 * | 7/2002 | Stopczynski et al. .......... | 342/70 |
| 6,970,129 B2 * | 11/2005 | Kumon et al. .................. | 342/70 |
| 7,123,184 B2 * | 10/2006 | Shono .......................... | 342/89 |
| 2005/0184903 A1 * | 8/2005 | Isaji ............................ | 342/70 |

FOREIGN PATENT DOCUMENTS

| | | |
|---|---|---|
| AU | 200129853 A1 | 10/2004 |
| JP | A-9-152478 | 6/1997 |
| JP | A-11-64485 | 3/1999 |
| JP | A-11-271435 | 10/1999 |
| JP | A-2000-284047 | 10/2000 |
| JP | A-2001-305219 | 10/2001 |

* cited by examiner

*Primary Examiner*—Thomas H Tarcza
*Assistant Examiner*—Matthew M Barker
(74) *Attorney, Agent, or Firm*—Oliff & Berridge, PLC

(57) ABSTRACT

The invention is directed to reducing the number of high-frequency components in a phase monopulse radar. A received signal selected by alternately selecting two antennas by a first switch is amplified by a receiver amplifier and mixed in a mixer with a portion of a transmitter signal. Each beat signal output from the mixer is distributed via a second switch to a selected one of two processing systems.

2 Claims, 6 Drawing Sheets

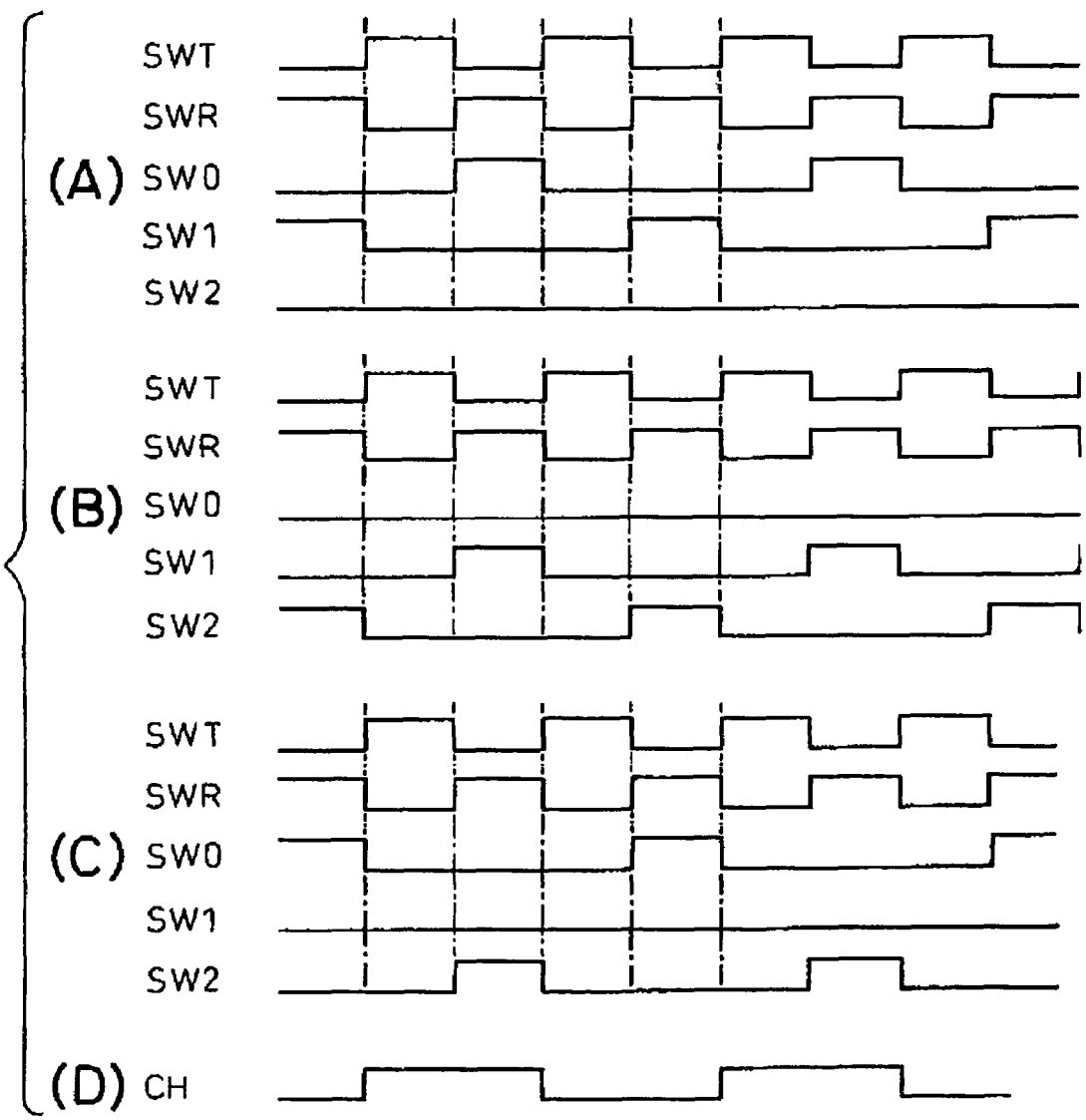

RADAR APPARATUS

BACKGROUND OF THE INVENTION

1. Field of the Invention

The present invention relates to the reduction of high-frequency components in a phase monopulse radar apparatus.

2. Description of the Related Art

It is known to use, as a technique for determining target bearing, a phase monopulse technique which computes target bearing from the phase difference between the echo signals received at two separate antennas. In a radar apparatus, such as a phase monopulse radar, that uses a plurality of receiving antennas, expensive high-frequency components such as a receiver amplifier, a mixer, etc. must be provided for each receiving antenna and there is, therefore, a demand to reduce the number of such high-frequency components.

On the other hand, as the phase monopulse performs a comparison of the phases of echo signals received at two antennas, there is a need to process these signals simultaneously in parallel fashion.

SUMMARY OF THE INVENTION

It is, accordingly, an object of the present invention to reduce the number of high-frequency components in a phase monopulse radar apparatus.

According to the present invention, there is provided a radar apparatus comprising: a first switch for alternately selecting received signals received at two antennas; a mixer for producing a beat signal by mixing a portion of a transmitter signal with the received signal selected by the first switch; and a second switch for distributing the beat signal produced from the received signal of each of the two antennas to a selected one of two processing systems.

According to the present invention, there is also provided a radar apparatus comprising: a first switch for alternately selecting received signals received at two antennas selected from among a plurality of antennas during each of a plurality of periods; a mixer for producing a beat signal by mixing a portion of a transmitter signal with the received signal selected by the first switch; and a second switch for distributing the beat signal produced from the received signal of each of the two antennas to a selected one of two processing systems, wherein the beat signal produced from the received signal of each of the two antennas is equally distributed among the two processing systems over the plurality of periods.

BRIEF DESCRIPTION OF THE DRAWINGS

FIG. 3 is a waveform diagram showing modulation of a wave by a triangular wave;

FIG. 4 is a waveform diagram showing the waveforms of various control signals in FIG. 2;

DESCRIPTION OF THE PREFERRED EMBODIMENTS

Figure 1:
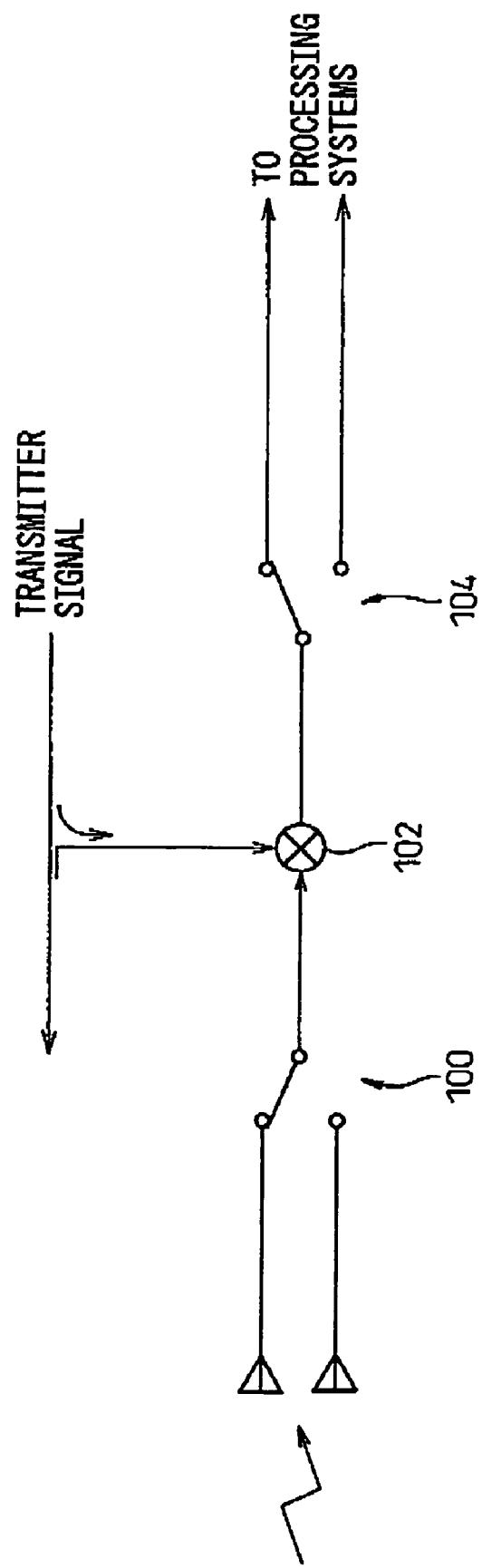
FIG. 1 is a diagram showing in simplified form the configuration of a radar apparatus according to the present invention.

FIG. 1 shows, in simplified form, the configuration of a radar apparatus according to the present invention. In FIG. 1, the radar apparatus of the present invention comprises a first switch 100 for alternately selecting received signals received at two antennas, a mixer 102 for producing a beat signal by mixing a portion of a transmitter signal with the received signal selected by the first switch 100, and a second switch 104 for distributing the beat signal produced from the received signal of each of the two antennas to a selected one of two processing systems.

Figure 2:
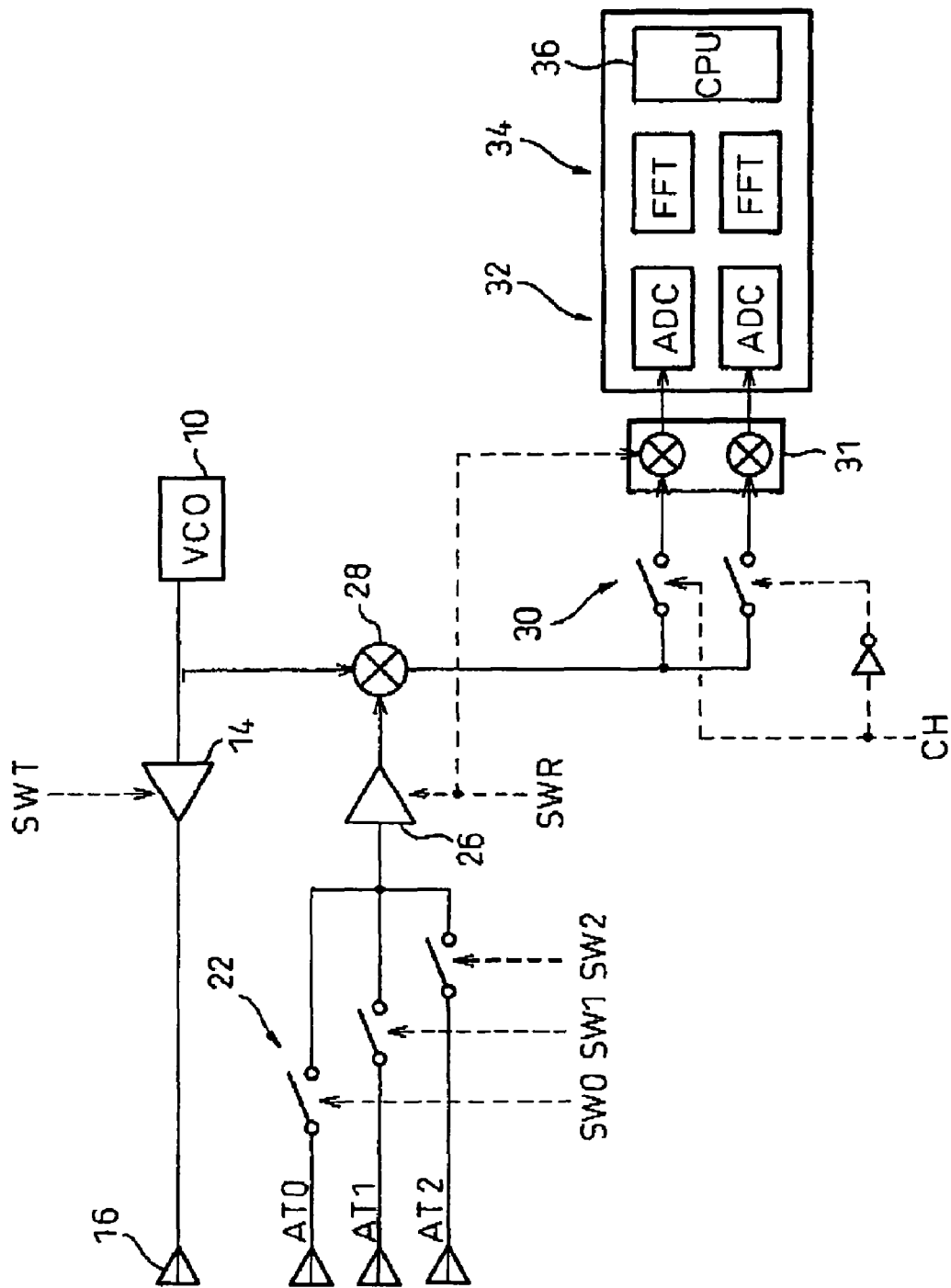
FIG. 2 is a diagram showing the configuration of a first example of an automotive FM-CW radar apparatus according to one embodiment of the present invention.

FIG. 2 is a block diagram showing the configuration of a first example of an automotive FM-CW radar apparatus according to one embodiment of the present invention. In FIG. 2, a transmitter signal frequency-modulated by a triangular wave is output from a voltage-controlled oscillator (VCO) 10 and amplified by a transmitter amplifier 14, and then transmitted out from a transmitting antenna 16. Of three antennas AT0, AT1, and AT2, the antenna selected by switch 22 is used for reception.

The signal received at each antenna is selected by the switch 22 and supplied to a receiver amplifier 26 where the signal is amplified; the amplified signal is mixed in a mixer 28 with a portion of the transmitted wave to produce a beat signal. The beat signal produced in the mixer 28 is distributed via a switch 30 to a selected one of two processing systems shown one above the other in the figure; then, the signal is converted by an A/D converter 32 into a digital signal, which is fast Fourier transformed (34) and input to a CPU 36. A mixer 31 is provided to cancel the frequency superimposed on the beat signal by mixing it with the same frequency, because the superimposition of the frequency occurs due to the switching, between transmission and reception, by signals SWT and SWR, the switching between the antennas by signals SW0 to SW2, and the switching between the processing systems by a signal CH.

FIG. 3 shows the waveform of the triangular wave applied to the voltage-controlled oscillator 10 in FIG. 2, and parts (A) to (C) of FIG. 4 show the waveforms of the control signals SWT, SWR, SW0, SW1, and SW2 input during the respective periods indicated by A to C in FIG. 3. In part (D) of FIG. 4, the waveform of the control signal CH applied to the switch 30 is shown in the same time scale and the same timing as those in parts (A) to (C). The time scale of the horizontal axis in FIG. 3 is greatly compressed compared with that in FIG. 4.

In the first cycle of the triangular wave shown in FIG. 3, that is, in the period A, a sequence of operations consisting of transmission, reception by AT0, transmission, and reception by AT1, in this order, is repeatedly performed as can be seen in FIG. 4(A). Then, as can be seen from FIG. 4(D), the beat signal produced from the signal received by AT0 is distributed via the switch 30 in FIG. 2 to the processing system in the upper part in the figure, while the beat signal produced from the signal received by AT1 is distributed to the processing system in the lower part in the figure, and the beat signals are thus processed in parallel. That is, in the period A, data is collected concerning the beat signals respectively produced from the signals received by the receiving antennas AT0 and AT1 during the rising and falling portions of the triangular wave. The frequencies of the peaks appearing in the Fourier transformed results are used to compute the distance and the relative velocity of the target, while the phases of the peaks are used to compute the phase monopulse implemented by the antennas AT0 and AT1.

In the second cycle of the triangular wave shown in FIG. 3, that is, in the period B, a sequence of operations consisting of transmission, reception by AT1, transmission, and reception by AT2, in this order, is repeatedly performed as can be seen in FIG. 4(B). Then, as can be seen from FIG. 4(D), the beat signal produced from the signal received by AT1 is distributed via the switch 30 in FIG. 2 to the processing system in the upper part in the figure, while the beat signal produced from the signal received by AT2 is distributed to the processing system in the lower part in the figure, and the beat signals are thus processed in parallel. That is, in the period B, data is collected concerning the beat signals respectively produced from the signals received by the receiving antennas AT1 and AT2 during the rising and falling portions of the triangular wave. The frequencies of the peaks appearing in the Fourier transformed results are used to compute the distance and the relative velocity of the target, while the phases of the peaks are used to compute the phase monopulse implemented by the antennas AT1 and AT2.

In the third cycle of the triangular wave shown in FIG. 3, that is, in the period C, a sequence of operations consisting of transmission, reception by AT2, transmission, and reception by AT0, in this order, is repeatedly performed as can be seen in FIG. 4(C). Then, as can be seen from FIG. 4(D), the beat signal produced from the signal received by AT2 is distributed via the switch 30 in FIG. 2 to the processing system in the upper part in the figure, while the beat signal produced from the signal received by AT0 is distributed to the processing system in the lower part in the figure, and the beat signals are thus processed in parallel. That is, in the period C, data is collected concerning the beat signals respectively produced from the signals received by the receiving antennas AT2 and AT0 during the rising and falling portions of the triangular wave. The frequencies of the peaks appearing in the Fourier transformed results are used to compute the distance and the relative velocity of the target, while the phases of the peaks are used to compute the phase monopulse implemented by the antennas AT2 and AT0.

As described above, the beat signal produced from the signal received by the antenna AT0 is processed by the processing system in the upper part during the period A, and by the processing system in the lower part during the period C. The beat signal produced from the signal received by the antenna AT1 is processed by the processing system in the lower part during the period A, and by the processing system in the upper part during the period B. The beat signal produced from the signal received by the antenna AT2 is processed by the processing system in the lower part during the period B, and by the processing system in the upper part during the period C. That is, as the switching sequence is designed so that the beat signal produced from the signal received by each antenna is equally distributed among the two processing systems, errors due to variations, etc. among the components used in the respective processing systems can be absorbed.

Figure 5:
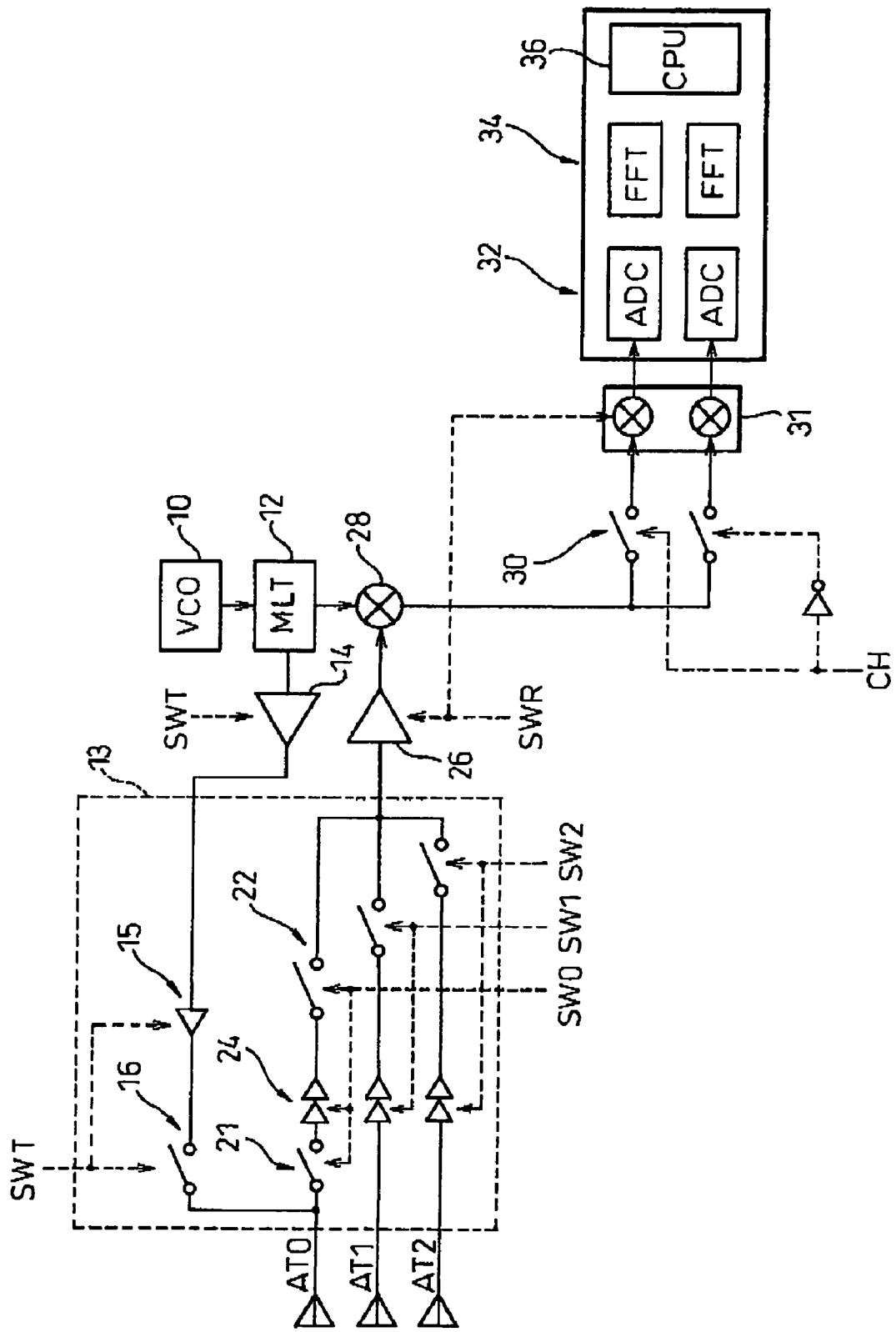
FIG. 5 is a diagram showing the configuration of a second example of the automotive FM-CW radar apparatus according to one embodiment of the present invention.

FIG. 5 is a block diagram showing the configuration of a second example of the automotive FM-CW radar apparatus according to one embodiment of the present invention. In FIG. 5, the transmitter signal frequency-modulated by the triangular wave, output from the voltage-controlled oscillator (VCO) 10, is supplied to a multiplier 12 where the signal is multiplied to produce a millimeter-wave signal, which is then amplified by the transmitter amplifier 14 and fed to an antenna selecting switch 13; in the antenna selecting switch 13, the signal is passed via an amplifier 15 and a switch 16 and transmitted out from the antenna AT0. In the radar apparatus shown in FIG. 5, of the three antennas AT0, AT1, and AT2, only the antenna AT0 is used for transmission, and one of the three antennas AT0, AT1, and AT2, that is selected by the switch 22, is used for reception. A switch 21 for preventing the transmitter signal from leaking into the receiver side is provided between the antenna AT0 and an amplifier 24. If some other means is provided that can prevent the leakage into the receiver side, the switches 16 and 21 need not necessarily be provided.

The signal received at each antenna is amplified by the amplifier 24 and supplied via the switch 22 to the receiver amplifier 26 where the signal is amplified, and the amplified signal is mixed in the mixer 28 with a portion of the transmitted wave to produce a beat signal. The processing thereafter is the same as that of the first example described with reference to FIG. 2, and the signals applied to the respective switches are the same as those shown in FIG. 4.

Figure 6:
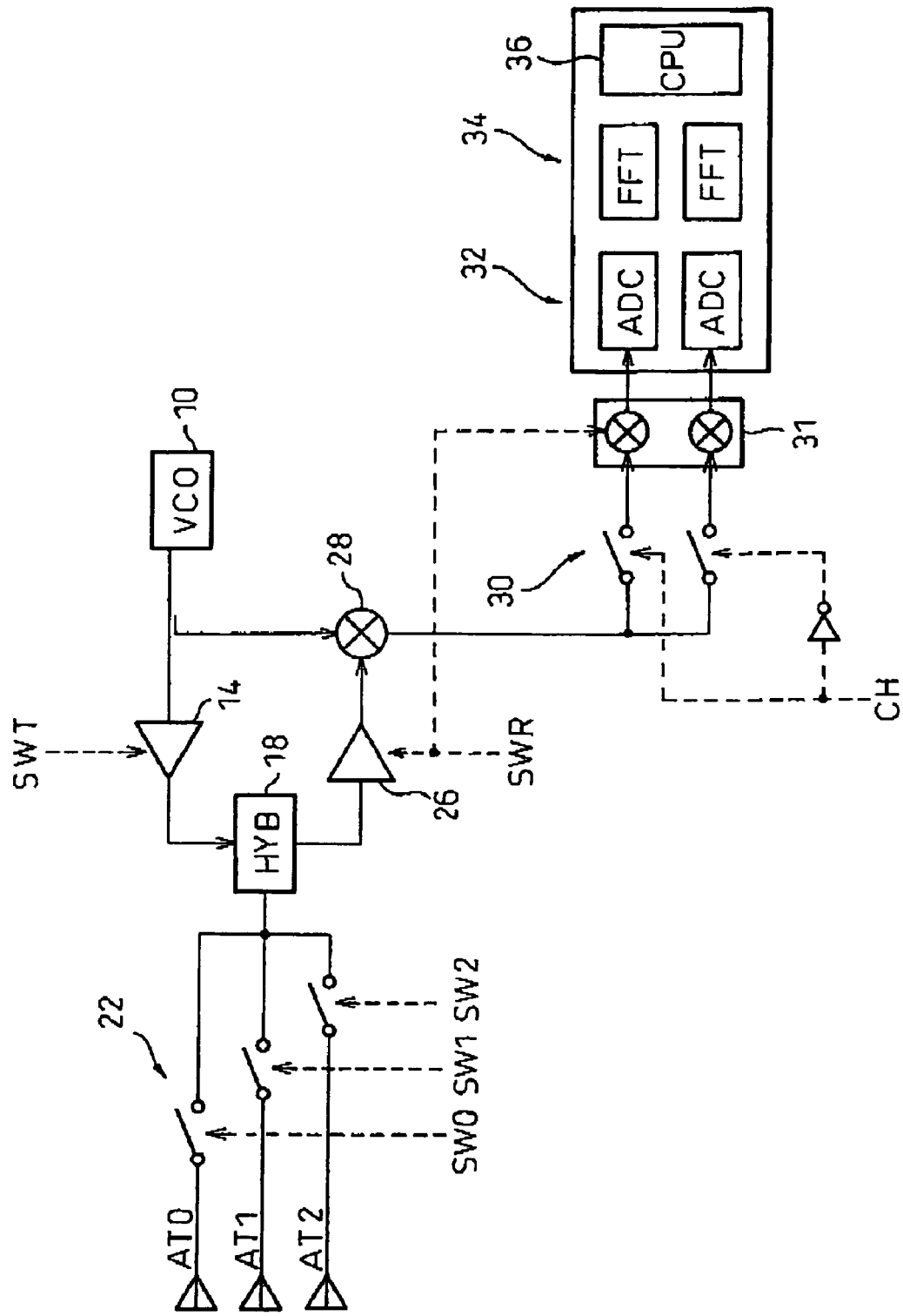
FIG. 6 is a diagram showing the configuration of a third example of the automotive FM-CW radar apparatus according to one embodiment of the present invention.

FIG. 6 shows a third example of the FM-CW radar apparatus of the present invention. This example differs from the example of FIG. 2 in that the transmitting antenna 16 is eliminated and a hybrid 18, as a duplexer, is included to enable the receiving antennas AT0 to AT2 to be used for transmission as well as for reception.

Figure 7:
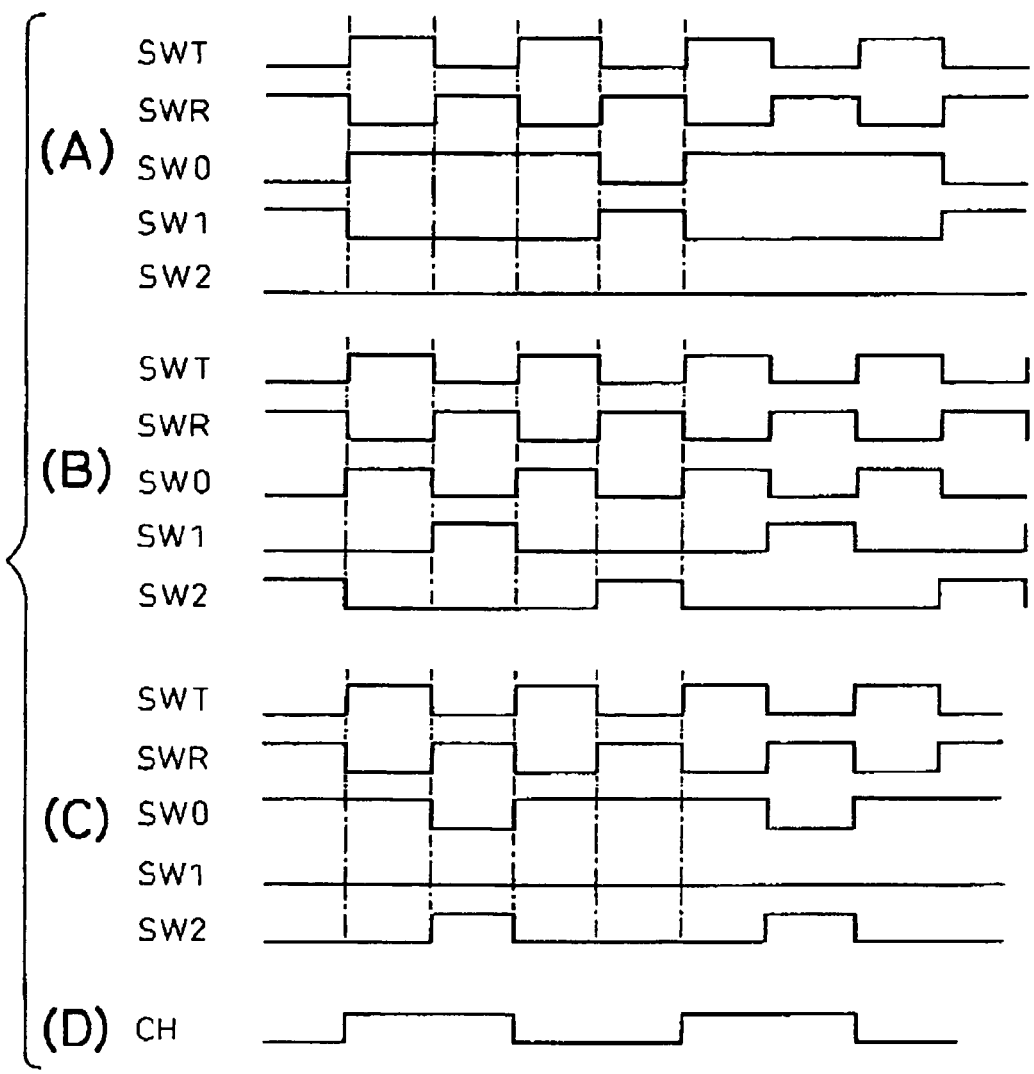
FIG. 7 is a waveform diagram showing the waveforms of various control signals in FIG. 6.

FIG. 7 shows, in a similar manner to FIG. 4, the waveforms of the control signals of FIG. 6 applied during the periods A to C of the triangular wave, such as shown in FIG. 3, that is applied to the voltage-controlled oscillator 10 in FIG. 6. The waveforms shown here are the same as those shown in FIG. 4, except that the signal SW0 is active during the period that the SWT is active, i.e., during the transmitting period. That is, the third example is the same as the first example, except that, of the antennas AT0 to AT2 in FIG. 6, the antenna AT0 is also used for transmission.

The invention claimed is:

1. A radar apparatus comprising:
a first switch for alternately selecting received signals received at two antennas selected from among more than two antennas during each of more than two periods;
a mixer for producing a beat signal by mixing a portion of a transmitter signal with the received signal selected by the first switch; and
a second switch for distributing the beat signal produced from the received signal of each of the two antennas to a selected one of two processing systems, wherein each of beat signals respectively produced from received signals of said more than two antennas is equally distributed among the two processing systems over the more than two periods.

2. A method for processing a radar received signal, comprising:
alternately selecting received signals received at two antennas selected from among more than two antennas during each of more than two periods;
producing a beat signal by mixing a portion of a transmitter signal with the selected received signal; and
distributing the beat signal produced from the received signal of each of the two antennas to a selected one of two processing systems, wherein
each of beat signals respectively produced from received signals of said more than two antennas is equally distributed among the two processing systems over the more than two periods.

* * * * *